United States Patent Office 3,639,419
Patented Feb. 1, 1972

3,639,419
ARYLPYRAZOLINE SULPHONIC ACID ESTERS
Siegfried Rosenberger, Domat Ems, Graubunden, Eduard Troxler, Basel, and Heinrich Hausermann, Riehen, Switzerland, assignors to Ciba-Geigy Corporation
No Drawing. Filed Dec. 18, 1967, Ser. No. 691,209
Claims priority, application Switzerland, Dec. 23, 1966, 18,479/66
Int. Cl. C07d 49/18
U.S. Cl. 260—310 D     7 Claims

ABSTRACT OF THE DISCLOSURE

Di- and tri-arylpyrazoline sulphonic acid esters are described which have unexpectedly a very good affinity to cellulose ester fibers and optically brighten these fibers in pure white, free from undesirable greenish or greenish-blue hues even when applied in higher concentrations; compositions containing such novel esters as well as other substances, especially detergents, are also described; and a process for optically brightening cellulose ester and particularly cellulose acetate fibers is also disclosed.

---

The present invention concerns a process for the production of di- and tri-arylpyrazoline sulphonic acid esters, their use as optical brighteners for polymeric material as well as, as industrial product, the polymeric material having a content of di- and tri-arylpyrazoline sulphonic acid esters according to the invention.

It is well known in the optical brightening of textile fibers that free arylpyrazoline-carboxylic acids and especially free arylpyrazoline sulphonic acids have poor affinity to cellulose acetate fibers (cf. British Pat. 669,590 to Ilford Ltd.), while alkali metal salts of such acids draw on to cellulose ester fibers only when dyed from an alkaline bath which is strong enough to hydrolyze the top layer of the cellulose ester fibers, so that the optical brightener anions can draw on to the resulting free cellulose portions of the fibers. From an acid or neutral bath, the aforesaid alkali metal salts, and especially alkali metal pyrazoline-arylsulfonates do not draw any better than the free acids.

This is also true for those arylpyrazolines which bear a sulphonamido substituent at an aryl nucleus and which have been recommended for the optical brightening of acrylic fibers (cf. French Pat. 1,172,759), but have insufficient drawing power on cellulose acetate fibers.

It is, therefore, an object of the present invention to provide arylpyrazoline derivatives which are optical brighteners of good drawing power on cellulose ester and especially cellulose acetate fibers and which brighten these fibers, even when applied in high dosage, in strong and brilliant white, free from undesirable greenish or greenish-blue hues, which often occur when known pyrazoline derivatives of good drawing power on cellulose acetate fibers are applied in higher dosages.

This object is attained with the novel arylpyrazoline sulphonic acid esters according to the invention which are of the formula $$Z-O-SO_2-\underset{}{\underset{}{\bigcirc}}-\underset{R_1}{\underset{|}{N}}\underset{CH-CH-R_2}{\overset{N=C-Ar}{\diagup}} \quad (I)$$

wherein $R_1$ represents hydrogen, a lower alkyl group or halogen up to the atomic number 35,
Ar represents a carbocyclic or heterocyclic aromatic radical unsubstituted or containing non-ionogenic and non-coloring substituents,
$R_2$ represents hydrogen or a lower alkyl group which can be linked in o-position with Ar,
$R_3$ represents hydrogen, a lower alkyl group or an aryl radical unsubstituted or containing non-ionogenic and non-coloring substituents, and
Z represents the aliphatic, araliphatic or cycloaliphatic radical of an alcohol, and which are surprisingly free from the disadvantages described above in that they impart to the treated substrates, and especially cellulose acetate fibers, on which they draw unexpectedly well, a blue violet to violet, brilliant brightening effect even when applied in high dosage.

In addition, the new optical brighteners have relatively very good fastness to industrial fumes and light. These properties, therefore, are of particular technical importance for the optical brightening of cellulose acetate fibres because hitherto these fibres could be brightened in a similarly brilliant way only with 4-methyl-7-alkylaminocoumarin which is not fast to light. Also, detergents which contain perborate or percarbonate are not discoloured by these optical brighteners.

In preferred compounds of Formula I, $R_1$, $R_2$ and $R_3$ represent hydrogen and the aryl radical Ar is preferably the unsubstituted phenyl radical or it can be the phenyl radical substituted by fluorine, chorine or bromine, low alkyl or alkoxy groups or by acylamido groups, e.g. carbacylamido groups such as low alkanoylamido or alkoxycarbonylamino groups; chlorine is the preferred p-substituent.

As heterocyclic aromatic radical, Ar is preferably the furyl or thienyl radical. If $R_1$, $R_2$ or $R_3$ represents a low alkyl group then this preferably has 1 to 4 carbon atoms, whilst $R_3$ as acyl radical is preferably the phenyl radical which can be substituted, for example, as given above for Ar.

Z preferably represents the radical of a primary, secondary or tertiary aliphatic alcohol having, in all, 1 to 12 carbon atoms, e.g. the methyl, ethyl, isopropyl, isobutyl, n-amyl, isoamyl, tert.butyl, hexyl, octyl, 2-methoxyethyl, 2-ethoxyethyl, 2-phenoxyethyl, 3-methoxypropyl, 2-dimethylaminoethyl, 2 - diethylaminoethyl, 2 - pyrrolidinoethyl, 2 - morpholinoethyl or the 2-piperidino-ethyl radical. The benzyl and 2-phenylethyl radical or the cyclohexyl radical are mentioned as radicals of araliphatic and cycloaliphatic alcohols respectively.

The pyrazoline sulphonic acid esters of Formula I are produced by reacting a sulphonic acid halide of the general Formula II $$X-SO_2-\underset{}{\underset{}{\bigcirc}}-\underset{R_1}{\underset{|}{N}}\underset{CH-CH}{\overset{N=C-Ar}{\diagup}}\underset{R_3\quad R_2}{} \quad (II)$$

wherein

X represents halogen up to the atomic number 35, preferably chlorine, and
$R_1$, Ar, $R_2$, $R_3$ represent the radicals given in Formula I, with an alcohol of Formula III $$Z-OH \quad (III)$$

wherein Z has the meaning given in Formula I,
the reaction preferably being performed in the presence of reaction accelerators.

As agents which accelerate the reaction, inorganic or organic bases such as alkali carbonates, alkali hydroxides, alkali alcoholates, particular however, tertiary nitrogen bases such as pyridine, triethylamine or triethylenediamine, can be used.

The pyrazoline sulphonic acid halides necessary for this reaction are obtained by processes known per se by, e.g. reacting the corresponding sulphonic acid in an inert solvent, optionally in the presence of reaction accelerators such as dimethyl formamide, with an inorganic acid halide such as thionyl chloride. They can also be produced however according to French Pat. No. 1,172,759, by reacting a pyrazoline of Formula IV

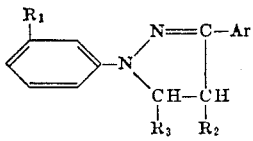

wherein $R_1$, Ar, $R_2$ and $R_3$ have the meanings given in Formula I, with a great excess of halogen sulphonic acid.

The reaction of the sulphonic acid halide of Formula II with the alcohol of Formula III is preferably performed in a solvent which is inert to the reaction components or in an excess of the alcohol to be reacted or in excess tertiary nitrogen base. It is preferably performed at a temperature between 40° and 120° C.

Solvents which are inert to the reaction components are, e.g. open chain or cyclic ethers such as diethyl ether, dibutyl ether or dioxane; optionally halogenated, aromatic hydrocarbons such as benzene, toluene, xylenes, chlorobenzene, tetralin; optionally halogenated aliphatic or hydrocaromatic hydrocarbons such as chloroform, carbon tetrachloride, tetrachloroethane, decalin; amides of low fatty acids such as dimethyl formamide; N,N' - tetraalkyl ureas such as N,N' - tetramethyl urea; dialkyl sulphoxides or dialkyl sulphones such as dimethyl sulphoxide or dimethyl sulphone.

Examples of tertiary nitrogen bases are pyridine, picolines, quinoline, triethylamine, tripropylamine, N-methyl pyrrolidine, N-methyl morpholine, N-methyl piperidine, quinuclidine or triethylenediamine.

Depending on the type of solvent used and on the solubility properties of the end product, the sulphonic acid esters formed either crystallise out of the reaction mixture on cooling or, then, they have to be isolated by the subsequent addition of water when a water miscible solvent has been used or, when difficultly water soluble solvents have been used, they have to be isolated by distillation off of the solvent.

The new pyrazoline derivatives form colourless to pale yellow coloured, well crystallised compounds which generally melt between 100 and 200° C. and have good to very good solubility in organic solvents such as alcohols, ketones, carboxylic acid esters, carboxylic acid amides, chlorinated aliphatic hydrocarbons, aromatic, optionally chlorinated, hydrocarbons, dialkyl sulphoxides and dialkyl sulphones. In substance, the products have a strong blue fluorescence in ultraviolet light; in organic solution they have an intensive blue-violet to violet fluorescene even in daylight.

The new compounds are suitable for the brightening of organic substrates of the most various types, mainly however, for improving the white grading of high molecular organic material from the class of synthetic products obtained by polymerisation, polycondensation or polyaddition, or from the class of partly synthetic products obtained by esterification of cellulose.

The brighteners according to the invention can be brought into or onto the substrate to be brightened during or after the desired shaping by incorporating them before or after polymerisation into the melted or plastified masses or, as is very often the case with the optical brightening of textile fibres, they can be brought onto textile fibres from aqueous dispersion. Preferably 0.01 to 5.0% of brightener, calculated on the substrate to be brightened, are used.

Preferably the high molecular material in the form of fibres, e.g. yarn, fabric or finished articles made of polyolefins, polyamides, polyacrylonitrile and copolymers thereof, mainly however, made of cellulose esters such as cellulose acetates having e.g. 2–3 acyl radicals per glucose unit, are brightened with an aqueous dispersion of pyrazolines of Formula I according to the invention. The brightener dispersion preferably has a content of 0.01 to 0.5% of pyrazoline according to the invention, calculated on the fibre material. In addition it can contain auxiliaries such as dispersing agents, e.g. condensation products of fatty alcohols having 10 to 18 carbon atoms and 15 to 25 moles of ethyleneoxide, or condensation products of alkyl mono- or poly-amines having 16 to 18 carbon atoms and at least 10 mols of ethylene oxide, and it can also contain acids, particularly organic acids such as acetic, oxalic and formic acid.

The fibre material is brightened with the aqueous brightener dispersion either by the drawing process at temperatures of, preferably, 50–100° C., or in the pad dyeing process. In the latter case, the goods are impregnated with the brightener dispersion and then finished, e.g. by steaming at 70 to 100° C. with saturated neutral steam. The finished fibre material is finally rinsed and dried.

Preferably, however, the fibre material mentioned is brightened by the drawing process. To produce the dispersions used in the drawing process, e.g. the pyrazolines according to the invention are either dissolved previously in a solvent such as ethylene glycol monomethyl ether and the solution added to the dye liquor containing dispersing agent, or, in the form of an aqueous slurry with a dispersing agent, they are finely milled until the particle size is less than 1 $\mu$ and the amount necessary of the preparation so obtained is further diluted with water.

High molecular organic material optically brightened according to the invention, particularly the synthetic fibre material brightened by the drawing process, has a pleasant, pure white, blue-violet to violet fluorescing appearance.

The pyrazoline sulphonic acid esters according to the invention can be applied from the washing bath by either incorporating them in amounts of, preferably 0.01–1%, into detergents or by adding them to the washing liquors, advantageously in the form of their solutions in neutral, water miscible and/or easily volatile organic solvents such as low alkanols, low alkoxyalkanols or low ketones.

The optical brighteners can be incorporated into the detergents, e.g. by mixing them with the wash active substances or kneading or milling them therewith and then mixing in the usual auxiliaries and fillers. The brightening agents are stirred, for example, with the wash active substances, the usual auxiliaries and fillers and water to form a slurry and this is then sprayed from an atomising dryer. The new pyrazoline derivatives, however, can also be admixed with finished detergents, e.g. by spraying a solution in an easily volatile and/or water soluble organic solvent onto the dry, circulating detergent.

These detergents can contain, e.g. the following wash active substances: soaps, higher fatty alcohol sulphates, alkyl-substituted aryl sulphonic acids, sulphocarboxylic acid alkyl esters, alkanoylaminoalkyl carboxylic or sulphonic acids, alkanoylaminoaryl carboxylic or sulphonic acids, or fatty acid glycerine sulphates or their soluble salts; also non-ionogenic agents such as higher alkylphenol polyglycol ethers. In addition, the detergents can contain the usual fillers and auxiliaries, e.g. alkali poly- and polymeta-phosphates, alkali silicates, alkali borates, alkali metal salts of carboxymethyl celluloses, foam stabilisers such as alkanolamides of higher fatty acids, or complex compounds such as soluble salts of ethylenediamine tetraacetic acid, as well as chemical bleachers such as perborates or percarbonates.

Compared with detergents not containing brightener, detergents containing brighteners of Formula I have an improved white appearance in daylight. In addition, detergents containing perborate or percarbonate as well as the brighteners according to the invention do not undergo an undesirable change in colour.

Textile fibres, e.g. synthetic polyamide and, mainly, cellulose ester fibres, washed with liquors containing the pyrazolines according to the invention of Formula I have a brilliant appearance in daylight. Such liquors, therefore, can be used particularly for the washing of these synthetic fibres or of textiles wholle or partly made up of such fibres and for the washing of household linen. For use in the household wash, the liquors can also contain other optical brightening agents having affinity to different fibres, e.g. to cellulose.

Although very beautiful brightening effects are obtained with the new optical brighteners on polyamide and polyacrylonitrile fibres, acetyl cellulose articles are the prefered substrate for these brighteners.

Particularly effective in the optical brightening of cellulose ester fibres, and especially of cellulose di-, 2½- and triacetate fibres are those brighteners falling under Formula I in which $R_1$ represents hydrogen or chlorine,
$R_2$ represents hydrogen,
$R_3$ represents hydrogen or phenyl,
Ar represents a phenyl radical any substitutents of which are selected from lower alkyl and chlorine, and
Z represents alkyl of from 1 to 12 carbon atoms, lower alkoxy-lower alkyl, lower alkoxy-lower alkoxy-lower alkyl, phenyl-lower alkyl, phenoxy-lower alkyl, cyclohexyl, morpholino-lower alkyl or pyridinyl-lower alkyl.

"Lower" when used in this specification and the appended claims in connection with an aliphatic group means that such group has at most 4 carbon atoms.

Further details of the invention can be seen from the following non-limitative examples. The temperatures are given therein in degrees centigrade. Percentages are given therein by weight.

EXAMPLE 1

36 g. of 1-(4'-chlorosulphonyl-phenyl)-3-(4'''-chlorophenyl)-pyrazoline are dissolved in 200 ml. of dimethyl formamide at 80°, 100 ml. of methanol are added to the solution while stirring and then immediately, one after the other, 15 ml. of 10 N sodium hydroxide solution and 400 ml. of a mixture of ice and water are added. The sulphonic acid methyl ester then precipitates in the form of fine yellowish crystal needles. These are filtered off under suction, washed with water until the washing water is neutral, the filter cake is well pressed out and the brightener is dried at about 70° in vacuo. In this way, 15 g. of 1-(4'-methoxysulphonyl-phenyl)-3-(4'''-chlorophenyl)-pyrazoline are obtained. The substance melts at 191–193° and corresponds to the formula

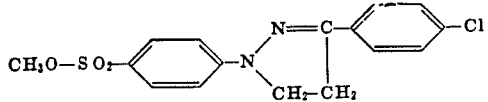

The new compound dissolves in glycol monomethyl ether with an intensive blue-violet fluorescence. The product can be used, e.g. for the brightening of cellulose acetate fibres, polyamide fibres or polyacrylonitrile fibres.

The 1-(4'-chlorosulphonyl-phenyl)-3-(4'''-chlorophenyl)-pyrazoline necessary in this example is obtained in the known way by reacting the sodium salt of 1-(4'-sulphophenyl)-3-(4'''-chlorophenyl)-pyrazoline with thionyl chloride in chlorobenzene in the presence of catalytic amounts of dimethyl formamide.

EXAMPLE 2

If in Example 1, the 1-(4'-chlorosulphonyl-phenyl)-3-(4'''-chlorophenyl)-pyrazoline is replaced by the equivalent amount of 1-(3'-chloro-4'-chlorosulphonyl-phenyl)-3-(4'''-chlorophenyl)-pyrazoline then, with otherwise the same procedure, 1-(3'-chloro-4'-methoxysulphonyl-phenyl)-3-(4'''-chlorophenyl)-pyrazoline is obtained, M.P. 194–195°. The new compound dissolves in glycol monomethyl ether with a blue-violet fluorescence and is a valuable optical brightener for the fibres mentioned in Example 1.

Valuable optical brighteners are also obtained on using 1-(4'-chlorosulphonyl-phenyl)-3-(3'',4''-dichlorophenyl)-pyrazoline, 1-(4'-chlorosulphonyl-phenyl)-3-(3''-methyl-4''-chlorophenyl)-pyrazoline or 1-(4'-chlorosulphonyl-phenyl)-3-(4''-methylphenyl)-pyrazoline.

EXAMPLE 3

An anhydrous mixture of 36 g. of 1-(4'-chlorosulphonylphenyl)-3-(4'-chlorophenyl)-pyrazoline, 13.7 g. of pyridine and 56 g. of isobutanol is heated to 90° within 20 minutes and then kept for 20 minutes at this temperature. After cooling, 110 ml. of a mixture of methanol and water (volume ratio 2:3) are added, the crystal suspension formed is well stirred and the crystals are filtered off under suction. The pale yellowish coloured product obtained is well pressed out and dried in vacuo at about 70°. In this way 36 g. of 1-(4'-isobutoxysulphonylphenyl)-3-(4''-chlorophenyl)-pyrazoline are obtained, M.P. 134–135°. The new compound dissolves in glycol monomethyl ether with an intensive blue-violet fluorescence. The product can be used, e.g., for the optical brightening of cellulose acetate fibres, polyamide fibres or polyacrylonitrile fibres.

If in this example, the isobutanol is replaced by the equivalent amount of one of the hydroxyl compounds listed in column 2 of the following Table I, then corresponding esters of 1-phenyl-3-(4''-chlorophenyl)-pyrazoline-4'-sulphonic acid are obtained which have the melting points given in column 3.

TABLE I

| Example: | Hydroxyl Compound | Melting point, degree |
|---|---|---|
| 3a | $C_2H_5$—OH | 166–168 |
| 3b | $n$-$C_3H_7$OH | 145–146 |
| 3c | Iso-$C_3H_7$—OH | 1 160–162 |
| 3d | Tert.-$C_4H_9$—OH | 166 |
| 3e | $n$-$C_5H_{11}$—OH | 110 |
| 3f | Iso-$C_5H_{11}$—OH | 127–128 |
| 3g | $n$-$C_6H_{13}$—OH | 116–118 |
| 3h | $n$-$C_8H_{17}$—OH | 115–116 |
| 3i | $n$-$C_{12}H_{25}$—OH | 95–97 |
| 3k | ⌬—$CH_2$—OH | 176–179 |
| 3l | ⌬—$CH_2CH_2$—OH | 134–135 |
| 3m | $CH_3OCH_2CH_2$—OH | 148–149 |
| 3n | ⌬—$OCH_2CH_2$—OH | 151–152 |
| 3o | cyclohexyl-OH | 151–154 |
| 3p | $C_2H_5O$—$CH_2$—$CH_2$—O—$CH_2$—$CH_2$—OH | 45 |
| 3q | morpholino-$CH_2$—$CH_2$—OH | 1 260 |
| 3r | pyridinyl-$CH_2$—OH | 153 |

1 Decomposition.

These sulphonic acid esters too are valuable optical brighteners for the types of fibre mentioned above.

EXAMPLE 4

An anhydrous mixture of 21 g. of 1-(4'-chlorosulphonylphenyl) - 3 - (4" - chlorophenyl)-5-phenyl-pyrazoline, 15 g. of pyridine and 50 g. of isobutanol is heated to 90° within 10 minutes and then cooled immediately to 20°. 100 ml. of 50%, aqueous methanol are then added whereupon the ester precipitates in the form of pale yellowish coloured crystals. These are filtered off under suction, well pressed out and dried at 70° in vacuo. In this way, 17 g. of 1-(4'-isobutoxysulphonylphenyl)-3-(4"'-chlorophenyl)-5-phenyl-pyrazoline are obtained, M.P. 152-154°. The new compound dissolves in glycol monomethyl ether with an intensive blue-violet fluorescence. The product can be used for the brightening of cellulose acetate fibres.

If in this example, the isobutanol is replaced by the equivalent amounts of n-hexanol then, with otherwise the same procedure, the brightener 1-(4'-n-hexyloxysulphonylphenyl)-3-(4"'-chlorophenyl-5-phenyl-pyrazoline is obtained. It melts at 118-120° and has similar properties.

EXAMPLE 5

An anhydrous mixture of 9.6 g. of 1-(4'-chlorosulphonylphenyl)-3-phenyl-pyrazoline, 4.2 ml. of pyridine and 21 g. of isobutanol is heated to 90° within 20 minutes and then kept at this temperature for 20 minutes. After cooling, the precipitated, light green compound is filtered off by suction and dried in vacuum at 50°. The 8.8 g. of 1 - (4' - isobutoxysulphonylphenyl) - 3 - phenyl-pyrazoline so obtained are recrystallised from glycol monomethyl ether/water, whereby the new compound has a melting point of 129-131°. It dissolves in hot glycol monomethyl ether with an intensive blue-violet fluorescence. The product can be used, e.g., for the optical brightening of cellulose acetate fibres.

The 1 - (4' - chlorosulphonylphenyl) - 3 - phenyl-pyrazoline necessary in this example is obtained by methods known per se, by reacting the sodium salt of 1-(4'-sulphophenyl)-3-pyrazoline with thionyl chloride in chlorobenzene in the presence of catalytic amounts of dimethyl formamide.

If in this example, the isobutanol is replaced by 21 ml. of distilled glycol monomethyl ether, there are obtained, with otherwise the same procedure after the recrystallisation from glycol monomethyl ether, 3.7 g. of 1-[4'-(β - methoxy - ethoxy - sulphonyl) - phenyl]-3-phenyl-pyrazoline, M.P. 85-87°, which exhibits similar properties.

EXAMPLE 6

An anhydrous mixture of 9.75 g. of 1 - (4' - chlorosulphonylphenyl) - 3 - (3",4" - dichlorophenyl) - pyrazoline, 3.5 ml. of pyridine and 17.5 ml. of isobutanol is heated to 90° within 20 minutes and then kept at this temperature for 20 minutes. After cooling, 25 ml. of a methanol/water mixture (volume ratio 2:3) are added, the resulting crystal suspension is well stirred and then filtered off by suction. The pale yellowish coloured product so obtained is well squeezed out and dried in vacuum at 80°. 7.8 g. of 1-(4'-isobutoxy-sulphonyl-phenyl)-3-(3", 4"-dichlorophenyl)-pyrazoline are thus obtained, M.P. 160-161°. The new compound dissolves in glycol monomethyl ether with an intensive blue-violet fluorescence. The product can be used, e.g., for the optical brightening of cellulose acetate fibres.

The 1 - (4' - chlorosulphonyl - phenyl) - 3 - (3",4"-dichlorophenyl)-pyrazoline necessary in this example is obtained by methods known per se, by reacting the sodium salt of 1 - (4' - sulphophenyl) - 3 - (3",4"-dichlorophenyl)-pyrazoline with thionyl chloride in chlorobenzene in the presence of catalytic amounts of dimethyl formamide.

If in this example, the isobutanol is replaced by 17.5 ml. of distilled glycol monomethyl ether, there are obtained, with otherwise the same procedure, after the recrystallisation from glycol monomethyl ether, 4.5 g. of 1-(4'-methoxyethoxy - sulphonylphenyl) - 3 - (3",4" - dichlorophenyl)-pyrazoline, M.P. 174-175.5°, which exhibits similar properties.

EXAMPLE 7

A solution of the optical brightener of the formula

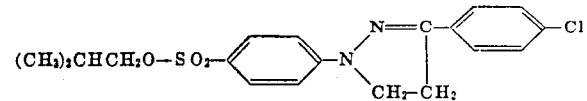

is produced by dissolving 1 g. in 100 ml. of ethylene glycol monoethyl ether. 2.4 ml. of this stock solution are added to an aqueous solution consisting of 100 ml. of water, 0.6 ml. of 4% acetic acid and 0.06 g. of octadecyl alcohol pentadecaglycol ether. The aqueous brightening solution so obtained is heated to 60° and then 3 g. of a cellulose triacetate twilled fabric are introduced into the solution. The temperature is raised to 95-98° within 10-15 minutes and kept there for 1 hour. The fabric is then rinsed and dried. Compared with untreated starting material, the fabric so treated has clearly a more white, brilliant appearance.

EXAMPLE 8

A solution of the optical brightener of the formula

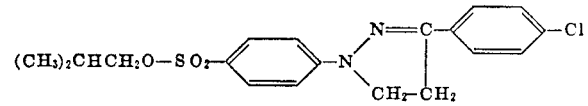

is produced by dissolving 1 g. in 100 ml. of ethylene glycol monoethyl ether. 2.4 ml. of this stock solution are added to an aqueous solution consisting of 100 ml. of water, 0.6 ml. of 4% acetic acid and 0.06 g. of octadecyl alcohol-pentadecaglycol ether. This preparation is heated to 40° and then 3 g. of a cellulose 2½-acetate satin fabric are introduced. The temperature is raised to 75° within 10-15 minutes and kept there for 1 hour. The fabric is then rinsed and dried. Compared with untreated starting material, the fabric so treated has clearly a more white, brilliant appearance.

EXAMPLE 9

10 g. of a pale yellowish staple fibre fabric made of Nylon (E. I. du Pont de Nemours, Wilmington, Del., U.S.A.) are treated for 30 minutes at 95° in a bath (liquor ratio 1:33) containing 0.02 g. of the brightener of the formula

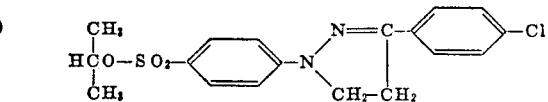

and 0.16 g. of concentrated acetic acid, and then rinsed and dried. The nylon fabric so treated appears considerably more white in daylight than the same but untreated fabric.

EXAMPLE 10

A solution of 0.1 g. of the brightener of the formula

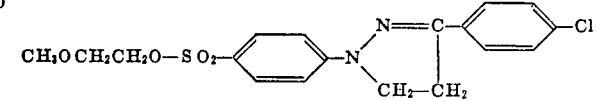

in 10 ml. of ethylene glycol monoethyl ether is added to a 50° warm bath consisting of 3000 ml. of water, 2 g. of the condensation product of 1 mol of stearyl alcohol and 22 mols of ethylene oxide, and 4 g. of 85% formic acid. 100 g. of a polyacrylonitrile fabric such as Orlon (E. I. du Pont de Nemours, Wilmington, Del., U.S.A.) are introduced and the temperature is raised to 100° within 15 minutes. The fabric is left for 60 minutes in the 100° hot circulating liquor whereupon it is rinsed with cold water, centrifuged and dried at 50-60°. The treated fibre material has a pleasant white appearance.

If instead of the brightener described above, 0.25 g. of the product of the formula

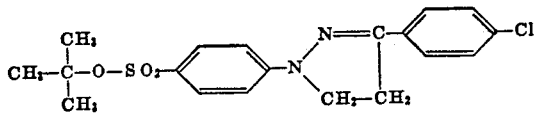

are used with otherwise the procedure given in the example, then a similar brightening effect is obtained on the fibre material mentioned.

EXAMPLE 11

A polyacrylonitrile fabric such as Orlon (E. I. du Pont de Nemours, Wilmington, Del., U.S.A.) is impregnated in a padding mangle with a 30° warm bath which contains a solution of 1 g. of the brightener

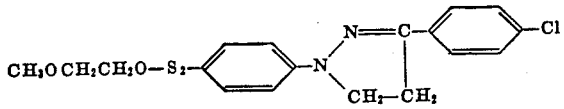

in 20 ml. of ethylene glycol monoethyl ether, 10 g. of 80% acetic acid and 2 g. of the condensation product of 1 mol of N-stearyl ethylenediamine and 2 mols of styrene oxide and 90 mols of ethylene oxide in 1000 ml. of water. The fabric is squeezed out to about 60% moisture content, rolled up and steamed in a pad-roll apparatus for 4 hours at 95°. Afterwards it is rinsed in a full width washing machine, first with 50° warm and then with cold water, and dried. In this way a fabric having a beautiful white appearance is obtained.

EXAMPLE 12

The following detergent components 21.4 g. of dodecylbenzene sulphonate,
32.6 g. of sodium tripolyphosphate,
1.1 g. of sodium carbonate,
4.5 g. of sodium silicate and
19.2 g. of sodium sulphate are worked into a homogeneous mass at 80° with
75 g. of water and, after addition of 0.15 g. of 4,4'-bis [4''-phenylamino-6''-($\beta$-methoxyethylamino) - 1'',3'', 5''-triazinyl-(2'')-amino]-stilbene-2,2'-disulphonic acid sodium salt, and
0.20 g. of brightener of the formula

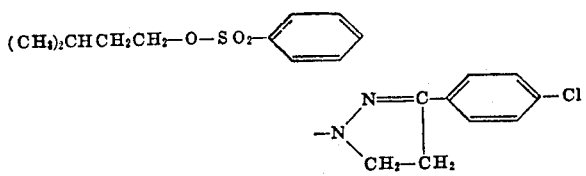

are well mixed and dried in an atomising dryer. The powder obtained is then blended with 12.7 g. of sodium perborate.

50 g. of goods to be washed consisting of 10 g. of uncoloured polycaprolactam fabric and 40 g. of uncoloured cotton fabric are washed for 20 minutes at 55° with a solution of 5 g. of the detergent described above in 1000 g. of water, rinsed and dried. A dazzling white wash is obtained.

Very good brightening effects are also obtained when 20 g. of cellulose 2½-acetate and 30 g. of cotton fabric are washed at 50° for 30 minutes with the same washing liquor.

EXAMPLE 13

To produce a fine detergent, 20 g. of sodium dodecylbenzene sulphonate and
8 g. of sodium salt of laurin alcohol sulphate are stirred with 80 g. of water and, at 60–70°, blended into a homogeneous mass with
0.3 of the brightener of the formula

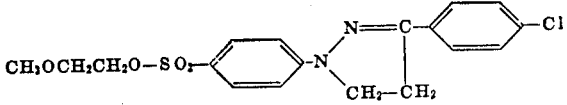

2 g. of lauric acid monoethanolamide,
8 g. of sodium tripolyphosphate,
1.5 g. of carboxymethyl cellulose and
60.5 g. of sodium sulphate are added to the mixture which is then dried and the particle size is reduced.

10 g. of white nylon are washed for 15 minutes at 55° in 200 g. of an aqueous washing liquor containing 1.0 g. of the fine detergent described above, rinsed and dried. The washed goods have clearly a more white appearance than similar nylon washed in the same way with a fine detergent of analogous composition but not containing brightener.

10 g. of white cellulose-2½-acetate goods are washed for 20 minutes at 50° in 200 g. of the above mentioned washing liquor. A beautiful white fabric is obtained.

EXAMPLE 14

100 g. of a heavy duty synthetic detergent consisting of 15.2 g. of dodecylbenzene sulphonate
3.8 g. of sodium salt of laurin alcohol sulphuric acid ester
25.6 g. of sodium polyphosphate
7.6 g. of tetrasodium pyrophosphate
4.8 g. of water glass (sodium silicate)
1.9 g. of magnesium silicate
5.0 g. of sodium carbonate
1.4 g. of carboxymethyl cellulose
0.3 g. of tetrasodium salt of ethylenediamine tetraacetic acid
34.4 g. of sodium sulphate are stirred with 100 g. of water into a homogeneous slurry. The slurry is well mixed with 0.1 g. of the sodium salt of 4,4'-[4'',6''-diphenylamino - 1'',3'',5'' - triazinyl-(2'')-amino]-stilbene-2,2'-disulphonic acid and 0.4 g. of a brightener of the formula

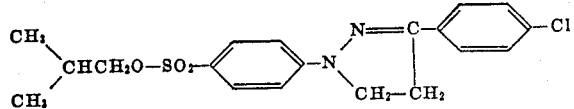

and then the mixture is sprayed in an atomising dryer. 100 g. of wash consisting of 30 g. of uncolored cellulose-2½-acetate fabric and 70 g. of uncoloured rayon fabric are washed for 20 minutes at 45° in a washing liquor which contains 8 g. of the detergent containing brightener described above (liquor ratio 1:10), rinsed and dried. Both types of fabrics are beautifully brightened in this washing process.

Similarly, when 30 g. of white nylon and 70 g. of white cotton are washed in the same washing liquor for 10 minutes at 85°, these fabrics are very well brightened.

EXAMPLE 15

0.2 g. of the brightener of the formula

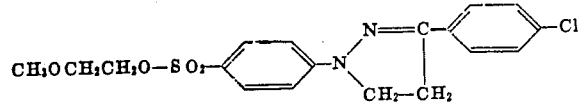

5 g. of titanium dioxide (Anatas), 75 g. of cellulose acetate and 25 g. of diethyl phthalate in 900 g. of acetone are homogenised into an opaque solution and cast onto glass plates. After evaporation of the acetone, a removable opaque film is obtained which is much more clearly white than a comparative sample produced without brightener.

We claim:
1. A compound of the formula:

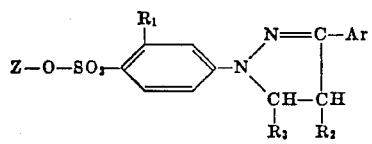

wherein
- $R_1$ represents hydrogen or chlorine,
- $R_2$ represents hydrogen,
- $R_3$ represents hydrogen or phenyl,
- Ar represents an unsubstituted phenyl radical or a phenyl radical substituted by lower alkyl or chlorine, and
- Z represents alkyl of from 3 to 12 carbon atoms, lower alkoxy-lower alkyl, lower alkoxy-lower alkoxy-lower alkyl, phenyl-lower alkyl, phenoxy-lower alkyl, cyclohexyl, morpholino-lower alkyl or pyridinyl-lower alkyl.

2. A compound as defined in claim 1, wherein Ar represents chlorophenyl and each of $R_2$ and $R_3$ represents hydrogen.

3. A compound as defined in claim 2, which is 1-(4'-isobutoxysulphonylphenyl)-3-(4''-chlorophenyl)-pyrazoline.

4. A compound as defined in claim 2, which is 1-(4'-isopropoxysulphonylphenyl)-3-(4''-chlorophenyl)-pyrazoline.

5. A compound as defined in claim 2, which is 1-[_'-(β-methoxy-ethoxy-sulphonyl)-phenyl]-3-(4''-chlorophenyl)-pyrazoline.

6. A compound as defined in claim 2, which is 1-(4'-t-butoxy-sulphonylphenyl)-3-(4''-chlorophenyl)-pyrazoline.

7. A compound as defined in claim 2, which is 1-(4'-isoamyloxysulphonylphenyl)-3-(4''-chlorophenyl)-pyrazoline.

References Cited
UNITED STATES PATENTS

| | | | |
|---|---|---|---|
| 2,639,990 | 5/1953 | Kendall et al. | 260—310 D |
| 2,640,056 | 5/1953 | Kendall et al. | 260—310 D |
| 2,740,793 | 4/1956 | Kendall et al. | 260—310 D |
| 3,357,988 | 12/1967 | Haüsermann et al. | 260—310 D |

NATALIE TROUSOF, Primary Examiner

U.S. Cl. X.R.

117—33.5; 252—8.75 98, 99, 110, 117, 137, 152, 161, 301.2 W; 260—247.1, 274.8 F